US011057800B2

(12) United States Patent
Chincholi et al.

(10) Patent No.: US 11,057,800 B2
(45) Date of Patent: Jul. 6, 2021

(54) NEIGHBOR CELL MEASUREMENT AND RESELECTION FOR NARROWBAND OPERATION

(71) Applicant: QUALCOMM Incorporated, San Diego, CA (US)

(72) Inventors: Amith Chincholi, Sunnyvale, CA (US); Chun-Hao Hsu, San Jose, CA (US); Gurdeep Singh, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/968,543

(22) Filed: May 1, 2018

(65) Prior Publication Data

US 2018/0324654 A1 Nov. 8, 2018

Related U.S. Application Data

(60) Provisional application No. 62/501,311, filed on May 4, 2017.

(51) Int. Cl.
*H04W 48/16* (2009.01)
*H04W 36/00* (2009.01)

(52) U.S. Cl.
CPC ....... *H04W 36/0061* (2013.01); *H04W 48/16* (2013.01); *H04W 36/0085* (2018.08)

(58) Field of Classification Search
CPC .......................... H04W 36/0061; H04W 48/16
See application file for complete search history.

(56) References Cited

U.S. PATENT DOCUMENTS

| 2017/0208592 | A1* | 7/2017 | Rico Alvarino | ........ H04W 4/70 |
| 2017/0289965 | A1 | 10/2017 | You et al. | |
| 2017/0290001 | A1 | 10/2017 | Axmon et al. | |
| 2018/0049181 | A1 | 2/2018 | Wu | |
| 2018/0198659 | A1* | 7/2018 | Ko | .......................... H04L 5/005 |
| 2018/0316464 | A1* | 11/2018 | Stern-Berkowitz | ......................... H04L 1/0034 |
| 2018/0317114 | A1* | 11/2018 | Kim | ...................... H04W 24/10 |
| 2018/0376484 | A1* | 12/2018 | Beale | .................... H04L 5/0053 |
| 2019/0150151 | A1* | 5/2019 | Nader | ..................... H04L 5/001 370/329 |
| 2019/0246371 | A1* | 8/2019 | Hwang | ................. H04W 64/00 |

OTHER PUBLICATIONS

NPL 3GPP, Jan. 2016 (NB—PBCH design for NB-IoT, R1-160042).*

(Continued)

*Primary Examiner* — Lakeram Jangbahadur
(74) *Attorney, Agent, or Firm* — QUALCOMM Incorporated

(57) ABSTRACT

Aspects of the present disclosure provide techniques that may be utilized by a UE for performing neighbor cell measurement and reselection in narrowband deployment scenarios, such as NB-IoT deployment scenarios. For example, a method for wireless communications by a user equipment (UE), can include determining, while communicating in a serving cell, information regarding one or more transmission deployment mode parameters of at least one neighbor cell, and performing a neighbor cell search with measurement of narrowband reference signals (NRS) based on the one or more transmission deployment mode parameters.

16 Claims, 11 Drawing Sheets

(56) References Cited

OTHER PUBLICATIONS

Adhikary A., et al., "Performance Evaluation of NB-IoT Coverage," IEEE 84th Vehicular Technology Conference (VTC-Fall), Sep. 2016, 5 Pages.

Mangalvedhe N., et al., "NB-IoT Deployment Study for Low Power Wide Area Cellular IoT," IEEE 27th Annual International Symposium on Personal, Indoor, and Mobile Radio Communications (PIMRC)—Workshop: From M2M Communications to Internet of Things, 2016, 6 Pages.

\* cited by examiner

NEIGHBOR CELL MEASUREMENT AND RESELECTION FOR NARROWBAND OPERATION

CLAIM OF PRIORITY UNDER 35 U.S.C. § 119

The present Application for Patent claims benefit of U.S. Provisional Patent Application Ser. No. 62/501,311, filed May 4, 2017, assigned to the assignee hereof and hereby expressly incorporated by reference herein.

BACKGROUND

Field of the Disclosure

Certain aspects of the present disclosure generally relate to wireless communications and, more particularly, to neighbor cell measurement and reselection procedures in narrowband applications.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Wireless devices may include narrowband Internet-of-Things (NB-IoT) devices. IoT may refer to a network of physical objects, devices, or "things". IoT devices may be embedded with, for example, electronics, software, or sensors and may have network connectivity, which enable these devices to collect and exchange data.

Some next generation, NR, or 5G networks may include a number of base stations, each simultaneously supporting communication for multiple communication devices, such as UEs. In LTE or LTE-A network, a set of one or more base stations may define an e NodeB (eNB). In other examples (e.g., in a next generation or 5G network), a wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., central nodes (CNs), access node controllers (ANCs), etc.), where a set of one or more distributed units, in communication with a central unit, may define an access node (e.g., a new radio base station (NR BS), a new radio node-B (NR NB), a network node, gNB, etc.). A base station or DU may communicate with a set of UEs on downlink channels (e.g., for transmissions from a base station or to a UE) and uplink channels (e.g., for transmissions from a UE to a base station or distributed unit).

Some next generation, NR, or 5G networks may support an uplink-based medium access control (MAC) layer. In these networks, a UE may transmit a pilot signal (e.g., a reference signal) for network access devices (e.g., distributed units) to receive and measure. Based on measurements of the pilot signal by one or more network access devices, the network may identify a serving cell (or serving distributed unit) for the UE. As the UE moves within the network, the network may make at least some mobility decisions for the UE (e.g., decisions to initiate a handover of the UE from one serving cell to another serving cell) transparently to the UE (e.g., without notifying the UE of the mobility decision, or without involving the UE in the mobility decision).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, MIMO antenna technology, and carrier aggregation.

However, as the demand for mobile broadband access continues to increase, there exists a need for further improvements in LTE, MTC, IoT, and NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to neighbor cell measurement and reselection procedures in narrowband applications, such as narrowband Internet-of-Things (NB-IoT) applications.

Certain aspects of the present disclosure provide a method, performed by a user equipment (UE). The method generally includes determining, while communicating in a serving cell, information regarding one or more transmission deployment mode parameters of at least one neighbor cell and performing a neighbor cell search with measurement of narrowband reference signals (NRS) based on the one or more transmission deployment mode parameters.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Aspects of the present disclosure provide techniques that may be utilized by a UE for performing neighbor cell measurement and reselection, for example, in NB-IoT deployment scenarios.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). New Radio (NR) (e.g., 5G radio access) is an example of an emerging telecommunication standard. NR is a set of enhancements to the LTE mobile standard promulgated by 3GPP. The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE. For clarity, while aspects may be described herein using terminology commonly associated with 3G and/or 4G wireless technologies, aspects of the present disclosure can be applied in other communication systems, such as 5G and later, including NR technologies.

EXAMPLE WIRELESS COMMUNICATIONS NETWORK

Figure 1:
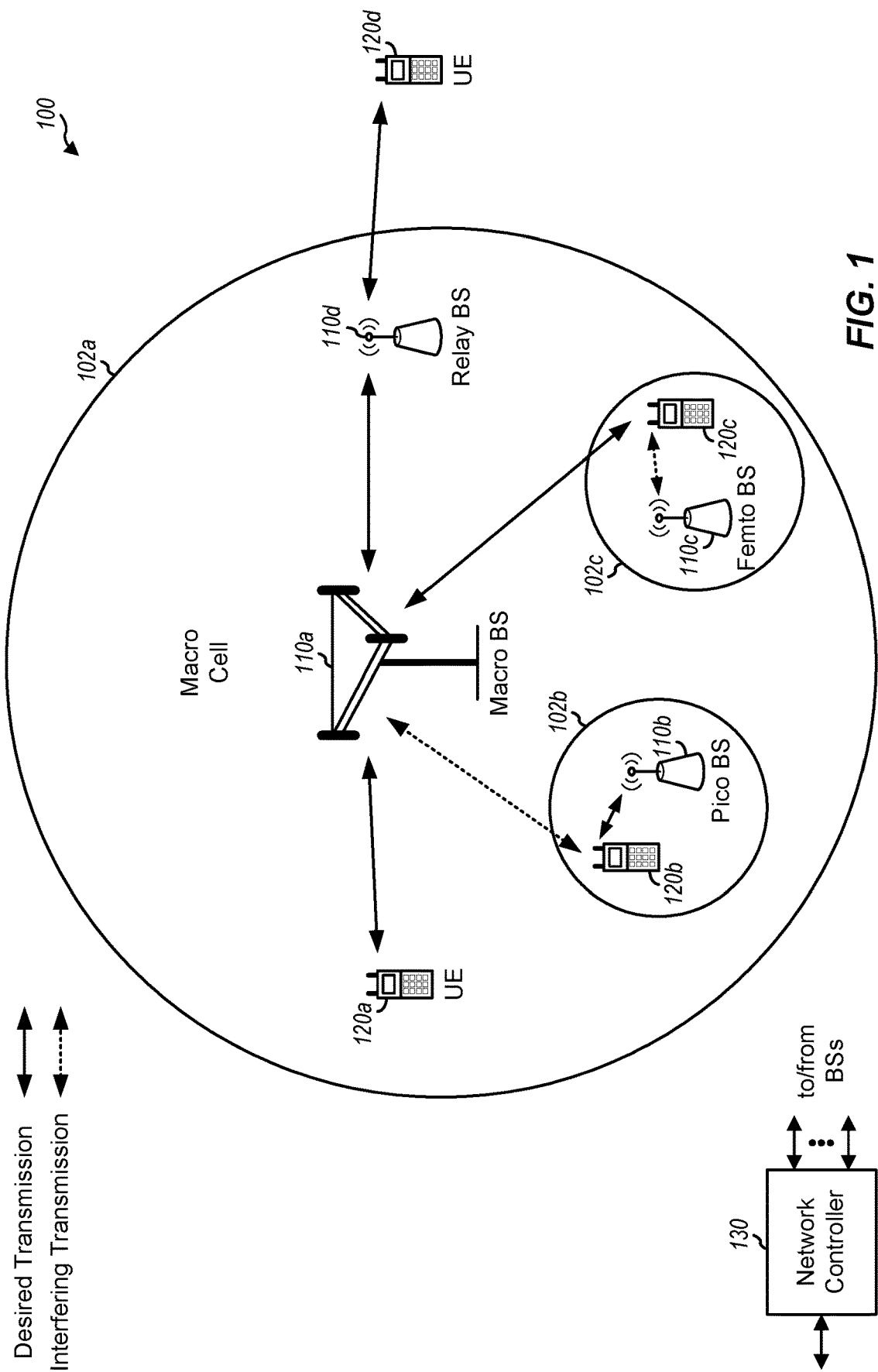
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used for neighbor cell measurement and reselection procedures in bandwidth limited (BL)/coverage enhancement (CE) applications, for example, machine type communication(s) (MTC), enhanced MTC (eMTC), and/or narrowband Internet-of-Things (NB-IoT).

The network 100 may be an LTE network or some other wireless network. Wireless communication network 100 may include a number of BSs 110 and other network entities. A BS is an entity that communicates with user equipments (UEs) and may also be referred to as a e Node B (eNB), a Node B, an access point, a 5G NB, gNB, transmission reception point (TRP), a new radio (NR) BS, etc. Each BS may provide communication coverage for a particular geographic area. In 3GPP, the term "cell" can refer to a coverage area of an BS and/or an BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station" and "cell" may be used interchangeably herein.

Wireless communication network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless communication network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless communication network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a netbook, a smartbook, an ultrabook, a drone, a robot, a sensor, a monitor, a meter, a camera/security camera, a gaming/entertainment device, a virtual reality/augmented reality device, a wearable device (e.g., smart watch, smart glasses, virtual reality goggles/helmet/glove/body suit, smart ring, smart bracelet, smart wrist band, smart jewelry, smart clothing, etc.), a vehicular/telematics device, a position location/navigation device (e.g., satellite-based, terrestrial-based, etc.), a medical/healthcare device, etc. Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices. In FIG. 1, a solid line with double arrows indicates desired transmissions between a UE and a serving BS, which is an eNB designated to serve the UE on the downlink and/or uplink. A dashed line with double arrows indicates potentially interfering transmissions between a UE and an BS.

Figure 2:
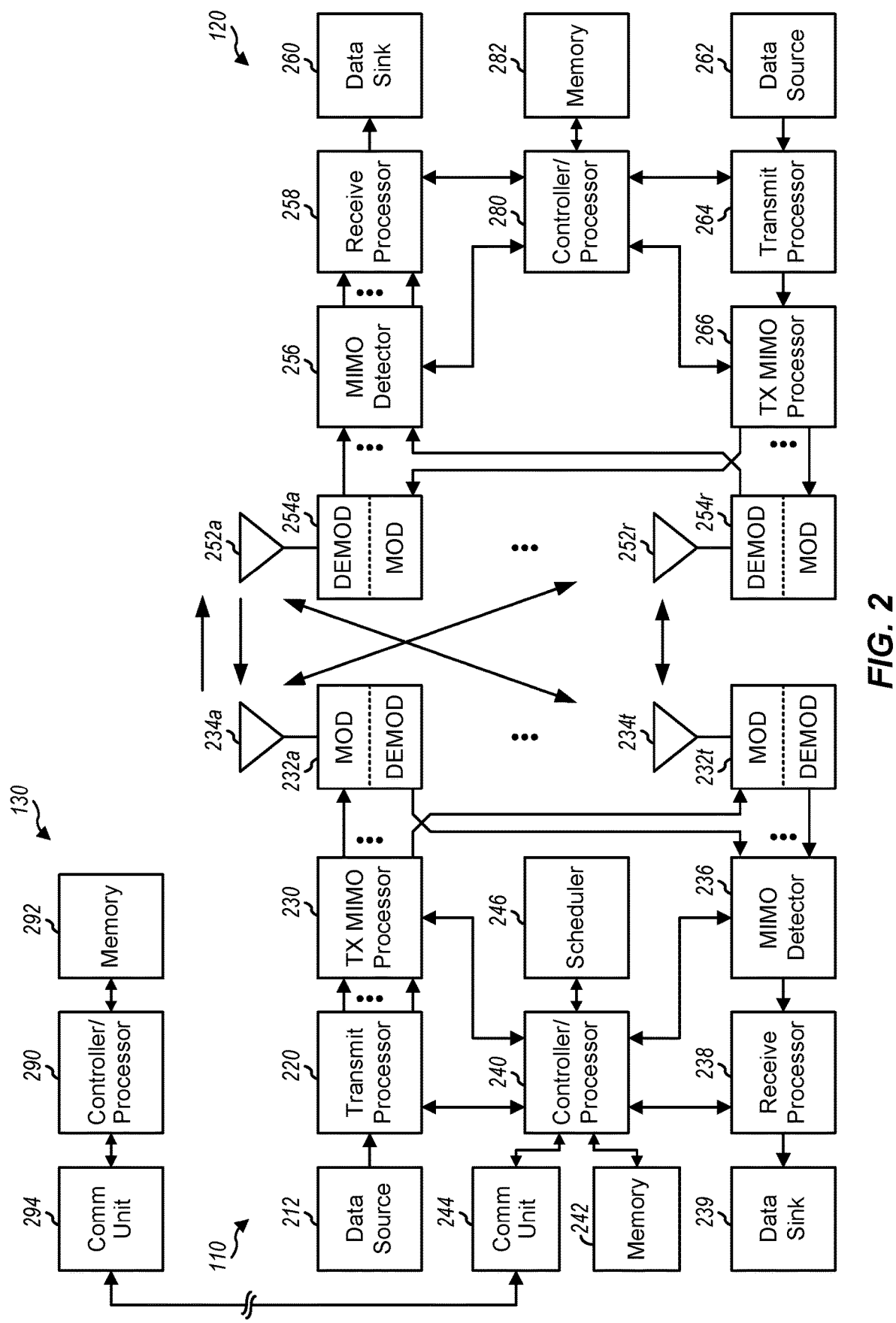
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of BS 110 and UE 120, which may be one of the base stations/eNBs and one of the UEs in FIG. 1. BS 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for HARQ timing for HARQ ID determination for MTC to use for communications between a UE (e.g., an eMTC UE or NB-IoT device) and a base station (e.g., an eNodeB, TRP, AP, NB, 5G NB, NR BS, gNB, etc.). For example, processor 240 and/or other processors and modules at base station 110, and processor 280 and/or other processors and modules at UE 120, may perform or direct operations of base station 110 and UE 120, respectively. For example, controller/processor 280 and/or other controllers/processors and modules at UE 120, and/or controller/processor 240 and/or other controllers/processors and modules at BS 110 may perform or direct operations 1100 shown in FIG. 11. Memories 242 and 282 may store data and program codes for base station 110 and UE 120, respectively. A scheduler 246 may schedule UEs for data transmission on the downlink and/or uplink.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 3:
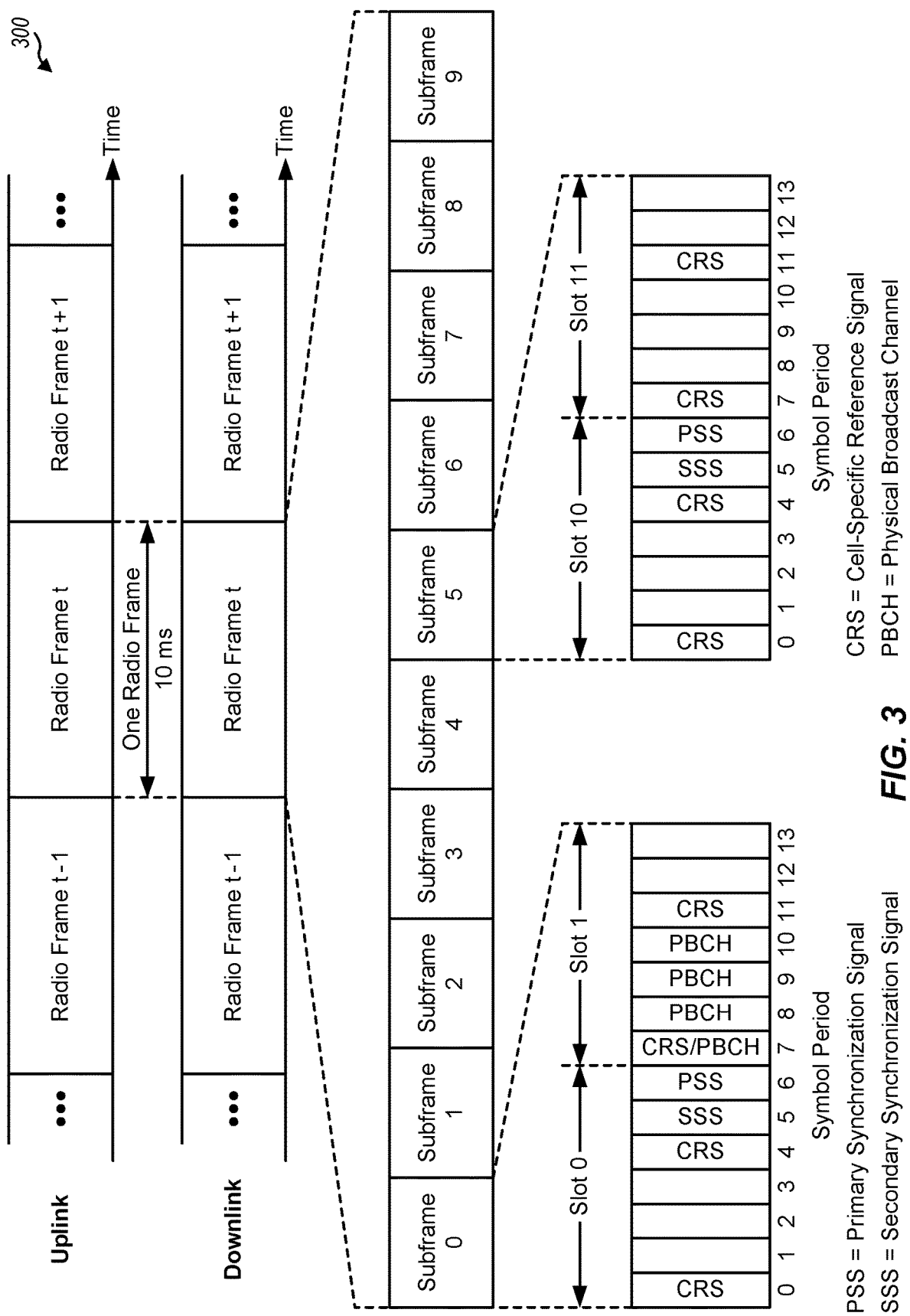
FIG. 3 is a block diagram conceptually illustrating an example of a frame structure in a wireless communications network, in accordance with certain aspects of the present disclosure.

FIG. 3 shows an exemplary frame structure 300 for FDD in a wireless communication system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

In certain wireless communication systems (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In certain systems (e.g., such as NR or 5G systems), a BS may transmit these or other signals in these locations or in different locations of the subframe.

Figure 4:
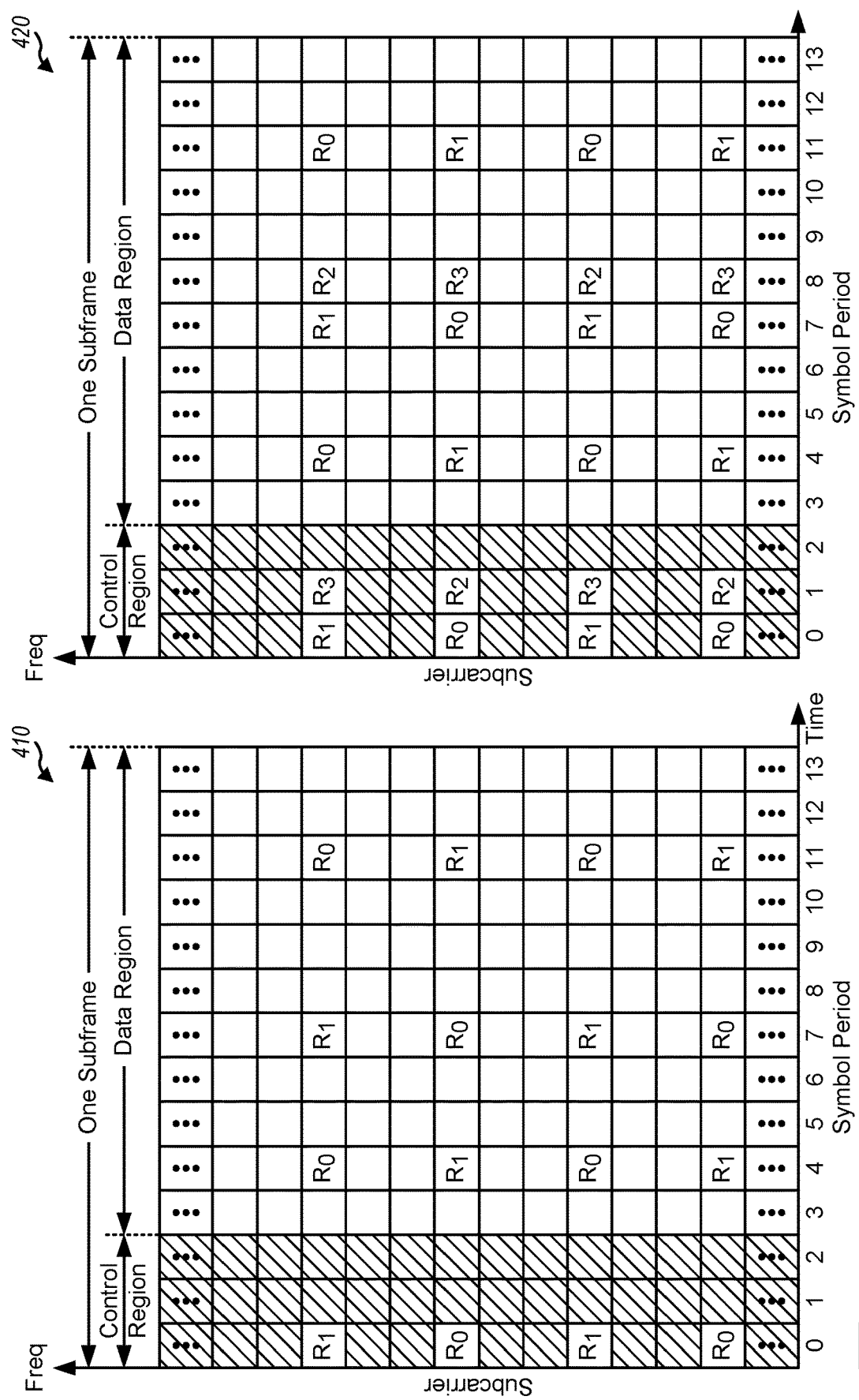
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

EXAMPLE ENHANCED MACHINE TYPE
COMMUNICATIONS (EMTC)

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, low cost, low rate devices need to be supported as well. For example, certain standards (e.g., LTE Release 12) have introduced a new type of UE (referred to as a category 0 UE) generally targeting low cost designs or machine type communications. For machine type communications (MTC), various requirements may be relaxed as only a limited amount of information may need to be exchanged. For example, maximum bandwidth may be reduced (relative to legacy UEs), a single receive radio frequency (RF) chain may be used, peak rate may be reduced (e.g., a maximum of 1000 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 μs is for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., enhanced PDCCH or ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB.

Figure 5:
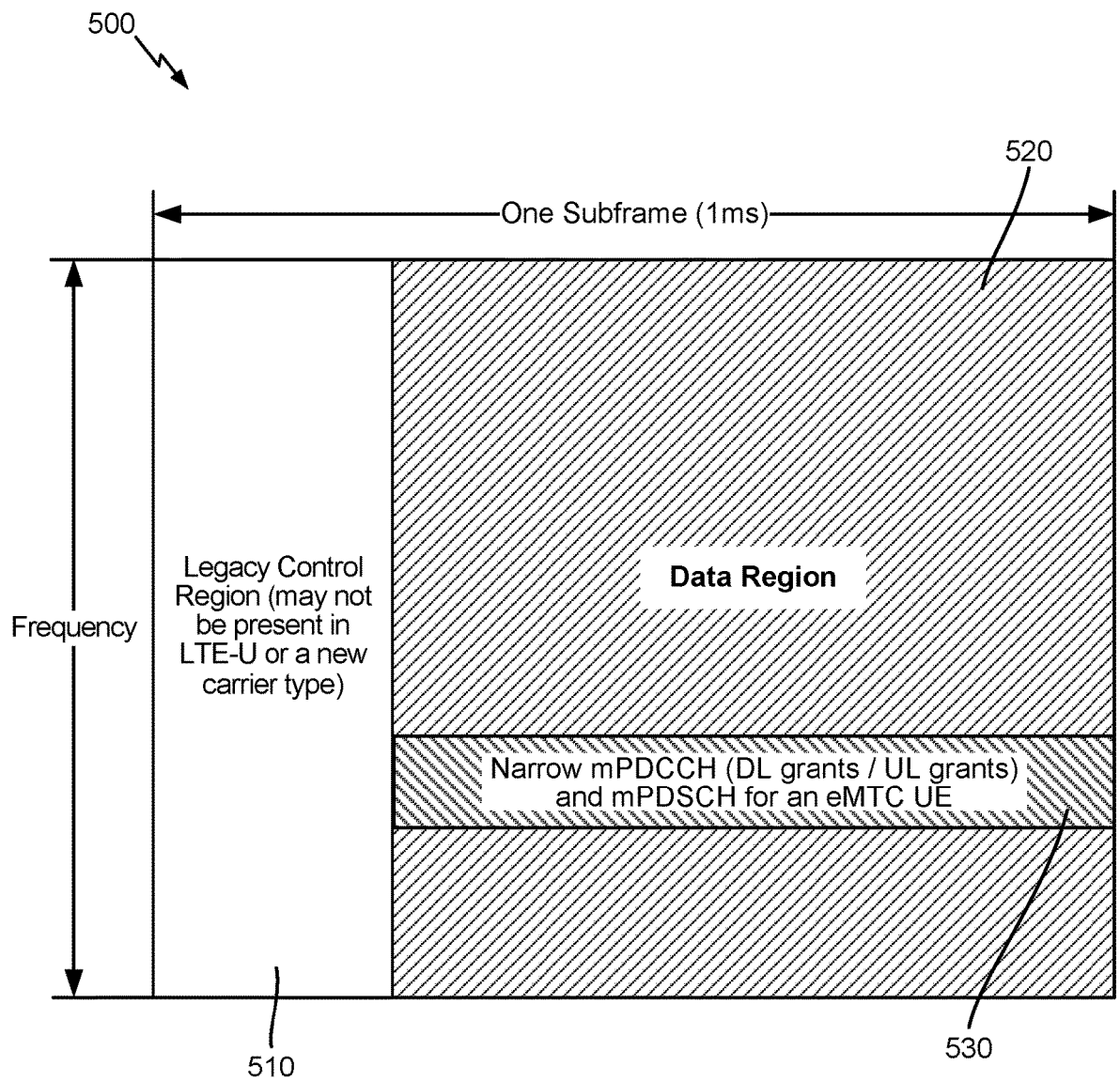
FIG. 5 illustrates an exemplary subframe configuration for enhanced machine type communications (eMTC), in accordance with certain aspects of the present disclosure.

As illustrated in the subframe structure 500 of FIG. 5, eMTC UEs can support narrowband operation while operating in a wider system bandwidth (e.g., 1.4/3/5/10/15/20 MHz). In the example illustrated in FIG. 5, a conventional legacy control region 510 may span system bandwidth of a first few symbols, while a narrowband region 530 of the system bandwidth (spanning a narrow portion of a data region 520) may be reserved for an MTC physical downlink control channel (referred to herein as an M-PDCCH) and for an MTC physical downlink shared channel (referred to herein as an M-PDSCH). In some cases, an MTC UE monitoring the narrowband region may operate at 1.4 MHz or 6 resource blocks (RBs).

However, as noted above, eMTC UEs may be able to operate in a cell with a bandwidth larger than 6 RBs. Within this larger bandwidth, each eMTC UE may still operate (e.g., monitor/receive/transmit) while abiding by a 6-physical resource block (PRB) constraint. In some cases, different eMTC UEs may be served by different narrowband regions (e.g., with each spanning 6-PRB blocks). As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

EXAMPLE NARROWBAND
INTERNET-OF-THINGS (NB-IOT)

The Internet-of-Things (IoT) may refer to a network of physical objects, devices, or "things". IoT devices may be embedded with, for example, electronics, software, or sensors and may have network connectivity, which enable these devices to collect and exchange data. IoT devices may be sensed and controlled remotely across existing network infrastructure, creating opportunities for more direct integration between the physical world and computer-based systems and resulting in improved efficiency, accuracy, and economic benefit. Systems that include IoT devices augmented with sensors and actuators may be referred to cyber-physical systems. Cyber-physical systems may include technologies such as smart grids, smart homes, intelligent transportation, and/or smart cities. Each "thing" (e.g., IoT device) may be uniquely identifiable through its embedded computing system may be able to interoperate within existing infrastructure, such as Internet infrastructure.

Narrowband IoT (NB-IoT) may refer to a narrowband radio technology specially designed for the IoT. NB-IoT may focus on indoor coverage, low cost, long battery life, and large number of devices. To reduce the complexity of UEs, NB-IoT may allow for narrowband deployments utilizing one physical resource block (PRB) (e.g., 180 kHz+20 kHz guard band). NB-IoT deployments may utilize higher layer components of certain systems (e.g., LTE) and hardware to allow for reduced fragmentation and cross compatibility with, for example, NB-LTE and/or enhanced/evolved machine type communications (eMTC).

Figure 6:
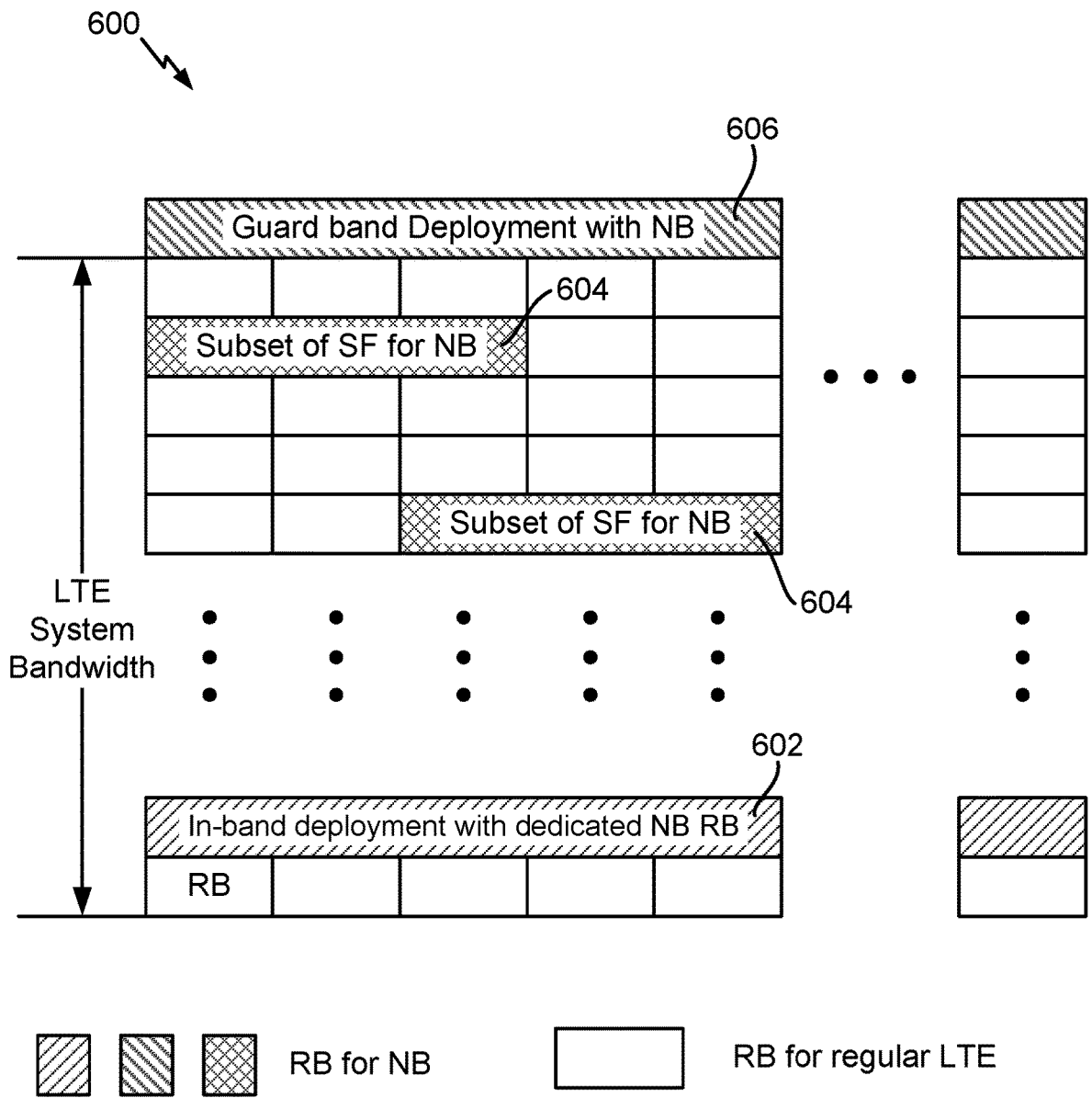
FIG. 6 illustrates an example deployment of narrowband Internet-of-Things (NB-IoT), in accordance with certain aspects of the present disclosure.

FIG. 6 illustrates an example deployment 600 of NB-IoT, according to certain aspects of the present disclosure. Three NB-IoT deployment configurations include in-band, guard-band, and standalone. For the in-band deployment configuration, NB-IoT may coexist with a legacy system (e.g., GSM, WCDMA, and/or LTE system(s)) deployed in the same frequency band. For example, the wideband LTE channel may be deployed in various bandwidths between 1.4 MHz to 20 MHz. As shown in FIG. 6, a dedicated resource block (RB) 602 within that bandwidth may be available for use by NB-IoT and/or the RBs 1204 may be dynamically allocated for NB-IoT. As shown in FIG. 6, in an in-band deployment, one RB, or 200 kHz, of a wideband channel (e.g., LTE) may be used for NB-IoT.

Certain systems (e.g., LTE) may include unused portions of the radio spectrum between carriers to guard against interference between adjacent carriers. In some deployments, NB-IoT may be deployed in a guard band 606 of the wideband channel.

In other deployments, NB-IoT may be deployed standalone (not shown). In a standalone deployment, one 200 MHz carrier may be utilized to carry NB-IoT traffic and GSM spectrum may be reused.

Deployments of NB-IoT may include synchronization signals such as PSS for frequency and timing synchronization and SSS to convey system information. For NB-IoT operations, PSS/SSS timing boundaries may be extended as compared to the existing PSS/SSS frame boundaries in legacy systems (e.g., LTE), for example, from 10 ms to 40 ms. Based on the timing boundary, a UE is able to receive a PBCH transmission, which may be transmitted in subframe 0 of a radio frame.

EXAMPLE NR/5G RAN ARCHITECTURE

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may have a length in time of 10 milliseconds (ms) and may consist of 2 half frames, each half frame consisting of 5 subframes. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
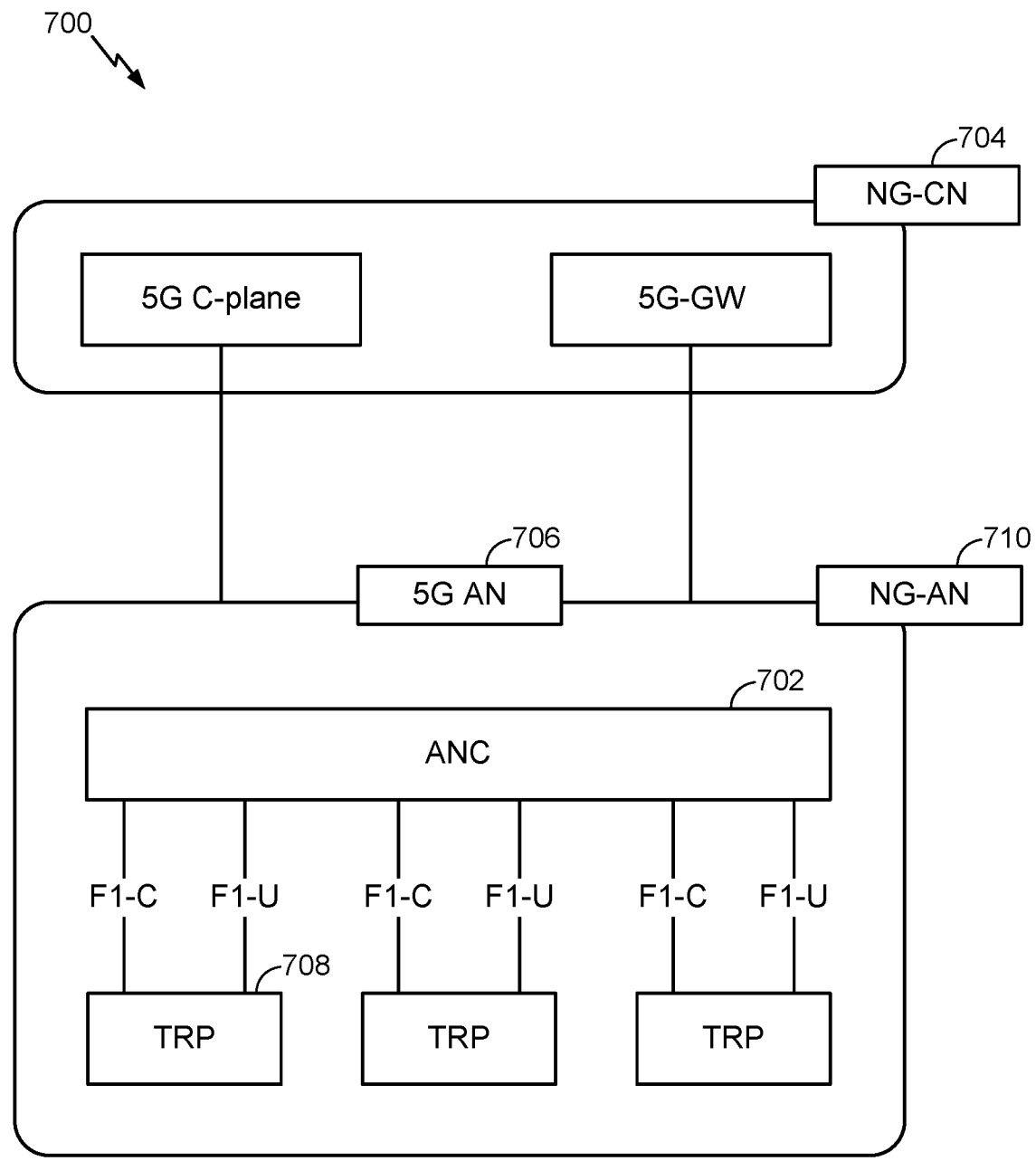
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

According to certain aspects, a BS may include a central unit (CU) (e.g., ANC 702) and/or one or more distributed units (e.g., one or more TRPs 708).

Figure 8:
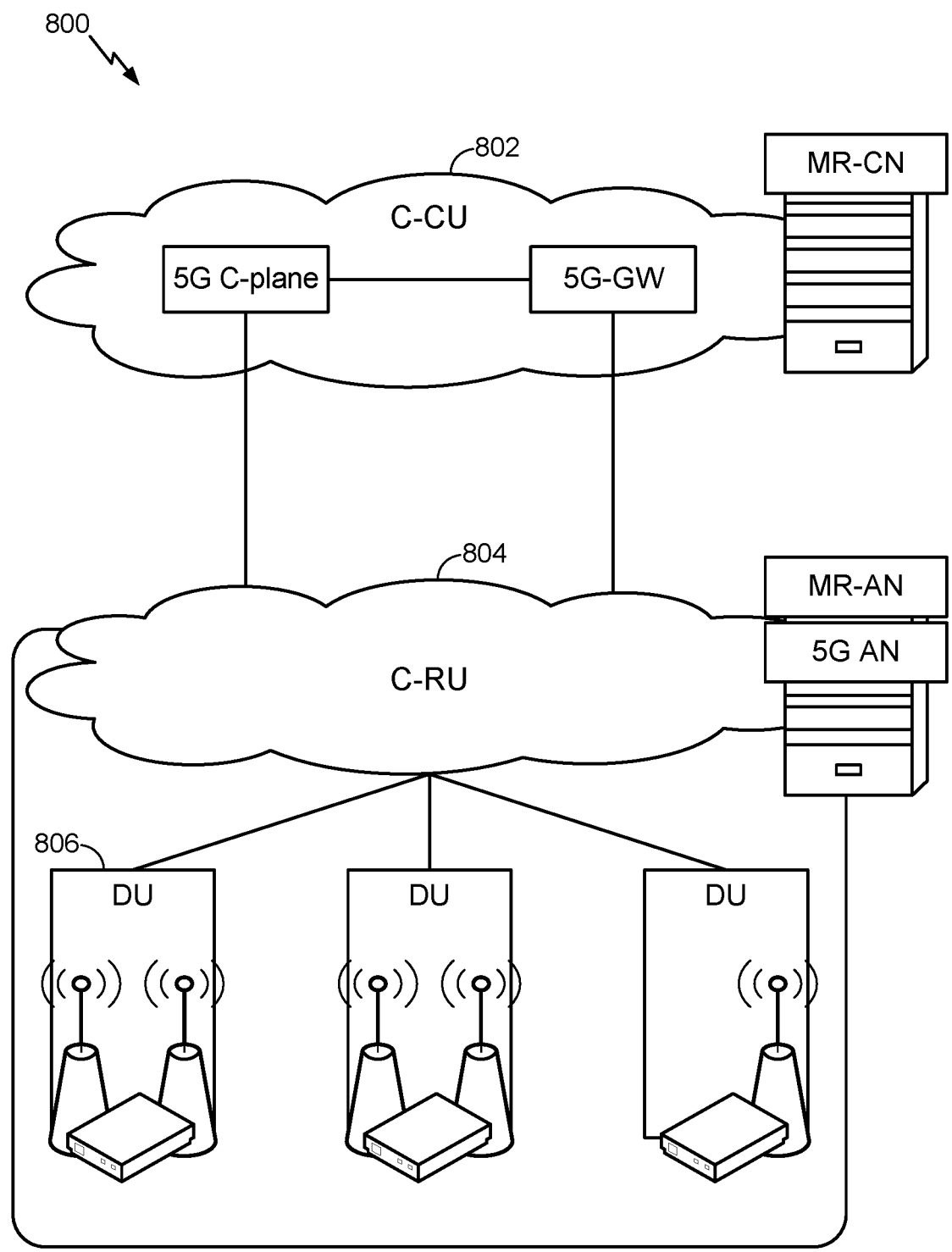
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity.

A centralized RAN unit (C-RU) 804 may host one or more ANC functions. Optionally, the C-RU may host core network functions locally. The C-RU may have distributed deployment. The C-RU may be closer to the network edge.

A distributed unit (DU) 706 may host one or more TRPs. The DU may be located at edges of the network with radio frequency (RF) functionality.

Figure 9:
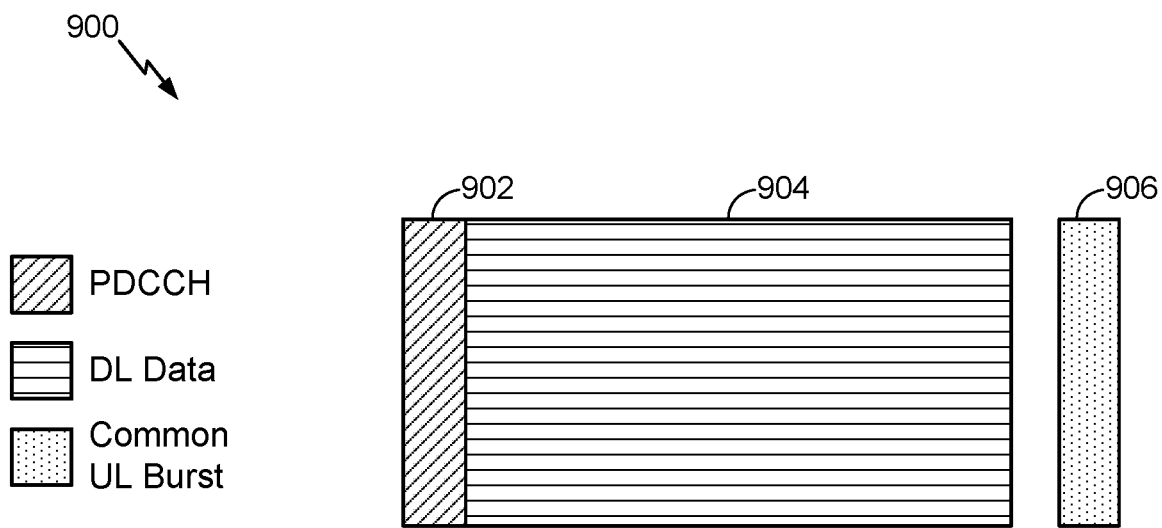
FIG. 9 is a diagram illustrating an example of a downlink (DL)-centric subframe, in accordance with certain aspects of the present disclosure.

FIG. 9 is a diagram 900 showing an example of a DL-centric subframe. A subframe may comprise a number of slots, for example, one or more DL slots and/or UL slots. A DL-centric subframe may comprise more DL slots than UL slots. The DL-centric subframe, as shown in FIG. 9, may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
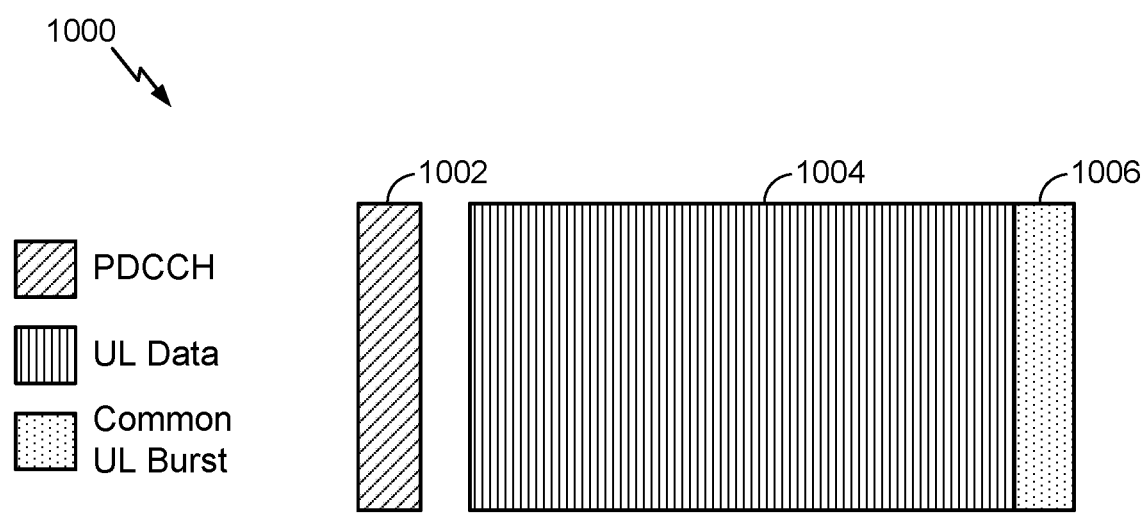
FIG. 10 is a diagram illustrating an example of an uplink (UL)-centric subframe, in accordance with certain aspects of the present disclosure.

FIG. 10 is a diagram 1000 showing an example of an UL-centric subframe. As noted above, a subframe may comprise a number of slots including one or more DL slots and/or UL slots. A UL-centric subframe may comprise more UL slots than DL slots. The UL-centric subframe, as shown in FIG. 10, may include a control portion 1002. The control portion 1002 may exist in the initial or beginning portion of the UL-centric subframe. The control portion 1002 in FIG. 10 may be similar to the control portion 1002 described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a physical uplink control channel (PUCCH). In some configurations, the data portion may be a physical uplink shared channel (PUSCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an access node (AN), or a distributed unit (DU), or portions thereof Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a central unit (CU) to which receiving network access device(s) transmit the measurements of the pilot signals, may use the measurements to identify serving cells for the UEs, or to initiate a change of serving cell for one or more of the UEs.

EXAMPLE NEIGHBOR CELL MEASUREMENT AND RESELECTION FOR NARROWBAND OPERATION

Aspects of the present disclosure provide techniques that may be utilized by a UE for performing neighbor cell measurement and reselection in narrowband deployment scenarios, such as NB-IoT deployment scenarios.

To ensure reliable performance, UEs operating in a current serving cell are typically configured to perform reselection to a strong neighbor cell. To perform reselection, a UE is typically expected to perform a neighbor cell search on the same E-UTRA Absolute Radio Frequency Channel Number (EARFCN) as the serving cell in order to find suitable intra-frequency neighbor cells or to retune to another EARFCN to find inter-frequency neighbor cells.

Upon finding strong neighbor cells on the EARFCN, a UE may perform a narrowband reference signal receive power (NRSRP) measurement on the neighbor cells. The UE may also make decisions based on a comparison of the neighbor cell NRSRP to the serving cell NRSRP. For example, if the neighbor cell NRSP exceeds the serving cell NRSP by a threshold amount:

neighbor_NRSRP−serving_NRSRP>threshold, the UE may reselect to the neighbor cell. Reselecting to the neighbor cell may involve a narrowband PBCH (NPBCH) decode followed by decoding of SIBs and then camping on the (target) neighbor cell.

Challenges are presented when performing neighbor cell measurement and reselection, however, when a UE does not have knowledge of transmission deployment parameters of the neighbor cells.

In some cases, in an NB-IoT deployment configuration, NB-IoT eNBs may be configured to operate with either one Tx antenna or two Tx antenna that are used for transmit diversity (TxD). It may be expected that standalone deployments may only support one Tx antenna. This may be because GSM cells may be reused/reframed for NB-IoT deployment. On the other hand, in-band and guard band cells may most likely support two Tx antennas, because many LTE cells use at least two Tx antennas.

Different deployment modes may also use different frequency resources, with raster offsets from reference frequencies. In some cases, for in-band deployment modes, NB-IoT cells may only be present on certain predefined LTE PRBs (PRBs within LTE system bandwidth) which have a raster offset of either 0 KHz, +/−2.5 KHz or +/−7.5 KHz. Guard band deployment modes may use raster offsets that are the same or similar to those in an in-band case. Standalone deployment mode cells, on the other hand, may be deployed on a 100 KHz raster. In some cases, a UE may acquire both a deployment mode and a TxD mode of the cell from the MIB after an NPBCH decode.

To prevent UEs from occupying DL resources for too long with long repetitions in the extreme coverage mode, DL subframes may be marked as valid or invalid for NB-PDCCH and NB-PDSCH (except SIBs) transmission as follows. Narrowband reference signals (NRS) may not be present in subframes considered invalid subframes. NB-IoT DL (valid/invalid) subframe configuration is typically set by an optional bit-map (downlinkBitmapNB) for the anchor PRB and another bit-map (downlinkBitmapNB-additional) for the non-anchor PRB, carried by NB-SIB1. The bitmaps vary depending on deployment mode. For example, for in-band deployment, a 10-bit bit-mask for 10 ms or 40-bit bit-mask for 40 ms (aligned to SFN mod 4) may be used. For guard-band and stand-alone modes, a 10-bit bit-mask for 10 ms may be used.

In some cases, this may mean NRS availability (via the DL valid/invalid bit-mask) for a cell may not be known until after decoding SIB1. Lack of knowledge of the transmission deployment parameters present challenges when performing neighbor cell measurement and reselection. In some cases, when certain cell reselection criteria ("S criteria") to perform neighbor cell search and measurement are met (e.g., Srxlev<Sintrasearch or Srxlev<Snonintrasearch), the UE is unaware of the neighbor cell deployment configuration.

In some cases, the UE may not know the TxD mode of neighbor cell, so NRSRP measurement may be inaccurate (e.g., positively or negatively biased) due to incorrect TxD mode assumption. Further, the UE may not know the valid subframe configuration of the neighbor cell and, thus, NRSRP measurement can be challenging and inaccuracy may be high (e.g., especially if the UE is in enhanced coverage of the neighbor cell). Inaccuracy in measurement, regardless of the reason, may result in incorrect reselection decision (i.e. not reselecting to a stronger cell) or potentially reselecting to a weaker cell because the neighbor cell measurement may be biased.

In addition, the UE may also not know the raster offset of the neighbor cell (e.g., with respect to the 100 KHz raster), so cell search/measurement may fail if the UE only searches on the 100 KHz raster points. Due to the high number of possible raster offset possibilities, cell search time/complexity increases if raster offset (or other information about a raster) has to be inferred by UE.

Figure 11:
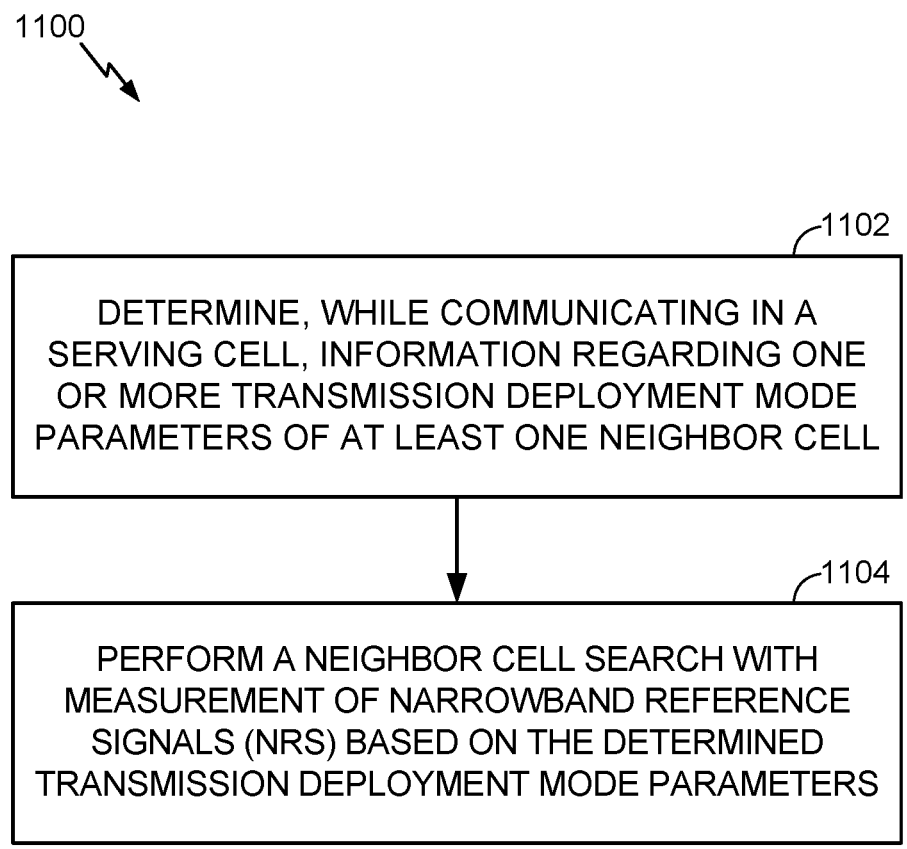
FIG. 11 illustrates example operations that may be performed by a UE for neighbor cell measurement and reselection, in accordance with certain aspects of the present disclosure.

FIG. 11 illustrates example operations 1100 that may be performed, for example, by a UE as part of a neighbor cell measurement and reselection procedure.

The UE operations 1100 begin, at 1102, by determining, while communicating in a serving cell, information regarding one or more transmission deployment mode parameters of at least one neighbor cell. At 1104, the UE performs a neighbor cell search with measurement of narrowband reference signals (NRS) based on the one or more transmission deployment mode parameters.

The UE may determine the transmission deployment mode parameters in various ways, depending on a particular implementation. In some cases, a network may signal neighbor cell transmission deployment mode parameters, such as TxD mode, raster offset, and DL valid bit mask. These parameters may be signaled in broadcast messages, such as SIB3, SIB4, or SIB5 of the serving cell. Such signaling may be implemented via a standard specification change. One advantage to this approach may be that a UE's neighbor NRSRP measurement accuracy may be more accurate if TxD mode is known. In some cases, the UE can correctly measure on the sub frames carrying NRS and can also account for the possibility of neighbor NRSRP measurement inaccuracy when triggering reselection if DL valid bit mask is known. Further, the UE's neighbor cell search time/complexity can be reduced significantly if raster offset is known.

In some cases, the UE can infer the neighbor cell transmission deployment parameters (or account for lack of knowledge of these parameters) during neighbor cell search and measurements. For example, the UE may include one or more operations for inferring information about a raster offset. In some cases, the UE may include evaluating a plurality of different hypotheses for different frequency errors to find frame and symbol timing. The UE may also include using one of the plurality of different hypotheses, selected based on the evaluation, to detect narrowband primary synchronization signals (NPSS) and narrowband secondary synchronization signals Regarding TxD mode inference, NRSRP estimation may be performed on a per Tx antenna basis by coherently averaging available NRS tones across 40 ms and then non-coherently averaging the results across multiple consecutive 40 ms durations making up the measurement period. If the cell has one Tx antennas, the NRSRP estimate of that Tx antenna may be reported after subtracting RF offset. If the cell has two Tx antennas, the sum of NRSRP estimates per Tx antenna may be reported after subtracting RF offset.

If the TxD mode is known (e.g., after MIB decode on a cell), NRSRP estimation can be done appropriately based on one Tx or two Tx antennas per the cell's TxD mode.

If the TxD mode is unknown (e.g., before MIB decode), the UE may evaluate multiple hypotheses regarding the number of Tx antennas. For example, in some cases, a UE may infer a number of transmit antennas used by the neighbor cell by evaluating different hypotheses corresponding to different numbers of transmit antennas, and may select one of the different hypotheses with a higher NRS receive power (NRSRP) than another. In some cases, the UE can perform a hypothesis testing of both cases (e.g., assume one Tx antenna and two Tx antenna scenarios) and pick the max of the two. In this manner, the NRSRP estimate and TxD mode of the cell can be inferred even before MIB decode.

In some cases, the UE may take action for neighbor measurement and cell reselection when a DL valid bit map is unknown. In some cases, the UE may perform NRSRP measurement while assuming the worst case availability pattern of NRS with a minimum amount of subframes with NRS availability (e.g., SF #0 and SF #4 of every frame and SF#9 of every other frame). This may imply, in enhanced coverage (CINR<-6 dB), that measurement inaccuracy can be very high due to low NRS density. In some cases, when the serving cell and neighbor cell are both in enhanced coverage (CINR<-6 dB), this may lead to high measurement inaccuracy (e.g., high bias in NRSRP measurement) that can lead to small separation in measured NRSRP per cell, even though the actual CINR difference is large.

In some cases, a UE (physical layer ML1) may be scheduled for multiple back to back measurements on a cell and/or maintain a list/history, for example, of last measurements (e.g., measured within the last 2 sec) on each cell. In some cases, the list may be sorted (by ML1) by NRSRP per cell. When comparing NRSRP of serving and target cell, the UE (ML1) may pick the median of the sorted list of each cell and compare the difference of the medians against a predefined threshold.

When the DL valid bit map is unknown, a UE may evaluate multiple hypotheses to perform neighbor cell measurement and reselection. For example, NRSRP measurement may be performed with all possible DL valid bit mask hypotheses and the one with the maximum NRSRP estimate can be used to determine the DL valid bit mask configured on neighbor cell and the associated NRSRP can be used for reselection triggering. One advantage to this approach may be that subsequent NPBCH decoding on a target cell can be run with the resulting hypothesis of DL valid mask and thus save some current consumption Regarding neighbor cell raster offset, as noted above, in some cases the serving cell may signal the neighbor cell's raster offset in SIBs to reduce cell search time/complexity.

If such signaling is not available, the UE may perform an initial acquisition (on the EARFCN) just to determine the total frequency offset. The UE may then apply the total frequency offset at the rotator. In some cases, the UE applies the total frequency offset before continuing to refine the frame and symbol timing, residual frequency error, and finding the physical cell Identifier (PCID). Under certain conditions, running initial acquisition may take a long time and, thus, may adversely impact power consumption. As an example, around 500 ms @CINR=−12.6 dB there may be an adverse impact on power consumption.

As an alternative, a UE may evaluate a limited number of hypotheses. For example, the UE may maintain five different frequency error hypotheses (e.g., 0 KHz, +/−2.5KHz, +/−7.5KHz) and, for each frequency hypotheses, the UE can start with cross correlation based narrowband PSS (NPSS) detection followed by narrowband SSS (NSSS) detection to find the frame and symbol timing, residual frequency error, and find the PCID. While initial acquisition time may be saved with this approach, evaluating five hypotheses in parallel (with higher searcher processing horsepower) or running them serially (with increased search time) may also adversely impact current consumption.

Techniques presented herein may be used by a UE to help perform neighbor cell measurement and reselection, even when neighbor cell transmission deployment mode parameters are not known.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Figure 11A:
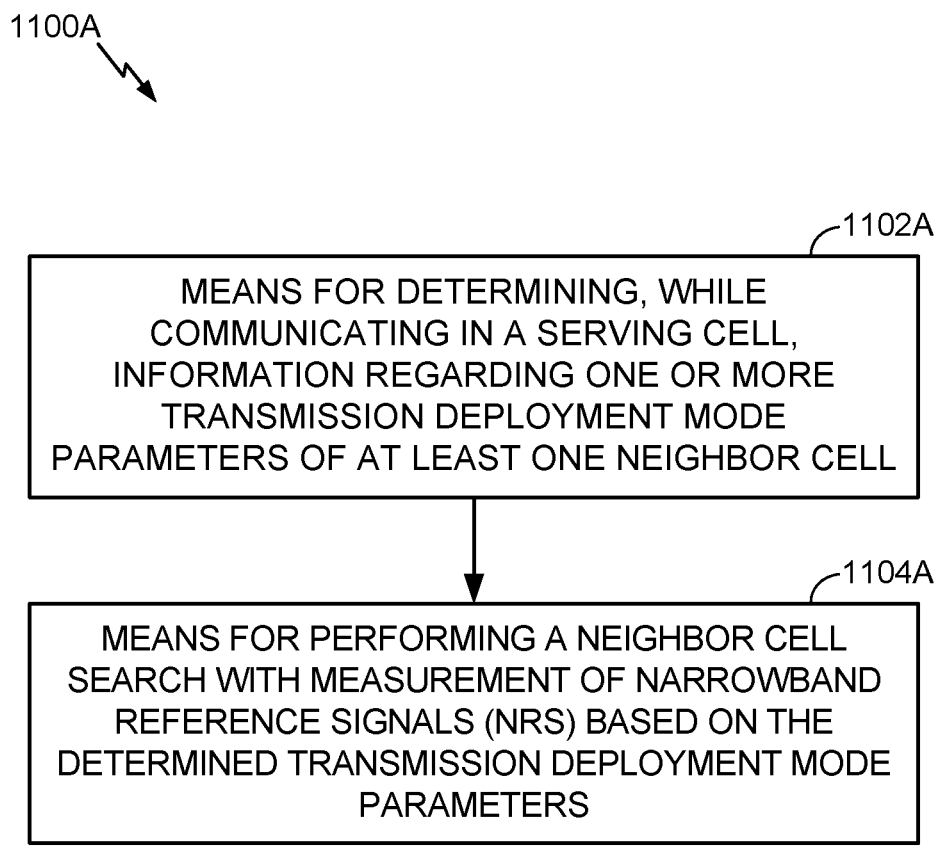
FIG. 11A illustrates example components capable of performing the operations shown in FIG. 11.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. Generally, where there are operations illustrated in Figures, those operations may be performed by any suitable corresponding counterpart means-plus-function components. For example, operations 1100 (1102, 1104) illustrated in FIG. 11 correspond to means 1100A (1102A, 1104A) illustrated in FIG. 11A.

For example, means for determining, means for performing, means for inferring, means for applying, means for transmitting, means for receiving, means for sending, means for applying, means for selecting, means for using, means for evaluating, and/or means for measuring may include one or more processors or other elements, such as the transmit processor 264, the controller/processor 280, the receive processor 258, and/or antenna(s) 252 of the user equipment 120 illustrated in FIG. 2, and/or the transmit processor 220, the controller/processor 240, and/or antenna(s) 234 of the base station 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the subject matter of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features described herein.

What is claimed is:

1. A method for wireless communications by a user equipment (UE), comprising:
    determining, while communicating in a serving cell, information regarding one or more transmission deployment mode parameters comprising a number of transmit antennas of at least one neighbor cell, without assistance associated with the one or more transmission deployment mode parameters from the serving cell, wherein the determining comprises:
        inferring the number of transmit antennas used by the at least one neighbor cell by evaluating different hypotheses corresponding to different numbers of transmit antennas, and
        selecting one of the different hypotheses with a higher narrowband reference signal receive power (NRSRP) than another based on the inferring the number of transmit antennas used by the at least one neighbor cell; and
    performing a neighbor cell search with measurement of NRSRP based on the determined information regarding the one or more transmission deployment mode parameters.

2. The method of claim 1, wherein:
    the one or more transmission deployment mode parameters further comprise information regarding availability of NRS in subframes;
    the determining comprises determining the information regarding availability of NRS in subframes for the at least one neighbor cell is unknown; and
    the performing the neighbor cell search with measurement comprises assuming a worst case pattern of subframes with a minimum amount of subframes with NRS availability.

3. The method of claim 1, wherein:
    the one or more transmission deployment mode parameters further comprise information regarding availability of NRS in subframes; and
    the determining comprises inferring the information regarding availability of NRS in subframes for the at least one neighbor cell by evaluating different hypotheses regarding different subframe bitmaps and selecting one of the different hypotheses with a higher NRS receive power (NRSRP) than another.

4. The method of claim 3, further comprising using the NRSRP of the selected hypothesis for reselection triggering.

5. The method of claim 3, further comprising using the selected hypothesis for decoding a narrowband physical broadcast channel (NPBCH) in the at least one neighbor cell.

6. The method of claim 1, wherein:
    the one or more transmission deployment mode parameters further comprise a raster offset of physical resource blocks (PRBs); and
    the determining comprises inferring the information about the raster offset by:
        performing an initial acquisition in the at least one neighbor cell to determine a total frequency offset; and
        applying the total frequency offset before refining frame and symbol timing, residual frequency error, and determining a physical cell ID (PCID) of the at least one neighbor cell.

7. The method of claim 1, wherein:
    the one or more transmission deployment mode parameters further comprise a raster offset of physical resource blocks (PRBs); and
    the determining comprises inferring the information about the raster offset by:
        evaluating a plurality of different hypotheses for different frequency errors to find frame and symbol timing; and
        using one of the plurality of different hypotheses, selected based on the evaluation, to detect narrowband primary synchronization signals (NPSS) and narrowband secondary synchronization signals.

8. An apparatus for wireless communications by a user equipment (UE), comprising:
    means for determining, while communicating in a serving cell, information regarding one or more transmission deployment mode parameters comprising a number of transmit antennas of at least one neighbor cell, without assistance associated with the one or more transmission deployment mode parameters from the serving cell, wherein the means for determining comprises:
        means for inferring the number of transmit antennas used by the at least one neighbor cell by evaluating different hypotheses corresponding to different numbers of transmit antennas, and
        means for selecting one of the different hypotheses with a higher narrowband reference signal receive power (NRSRP) than another based on the inferring the number of transmit antennas used by the at least one neighbor cell; and
    means for performing a neighbor cell search with measurement of NRSRP based on the determined information regarding the one or more transmission deployment mode parameters.

9. The apparatus of claim 8, wherein:
    the one or more transmission deployment mode parameters further comprise information regarding availability of NRS in subframes;
    the means for determining comprises means for determining the information regarding availability of NRS in subframes for the at least one neighbor cell is unknown; and
    the means for performing the neighbor cell search with measurement comprises means for assuming a worst case pattern of subframes with a minimum amount of subframes with NRS availability.

10. The apparatus of claim 8, wherein:
    the one or more transmission deployment mode parameters further comprise information regarding availability of NRS in subframes; and the means for determining comprises means for inferring the information regarding availability of NRS in subframes for the at least one neighbor cell by evaluating different hypotheses regarding different subframe bitmaps and selecting one of the different hypotheses with a higher NRS receive power (NRSRP) than another.

11. The apparatus of claim 10, further comprising means for using the NRSRP of the selected hypothesis for reselection triggering.

12. The apparatus of claim 10, further comprising means for using the selected hypothesis for decoding a narrowband physical broadcast channel (NPBCH) in the at least one neighbor cell.

13. The apparatus of claim 8, wherein:
the one or more transmission deployment mode parameters further comprise a raster offset of physical resource blocks (PRBs); and
the means for determining comprises means for inferring the information about the raster offset that include:
means for performing an initial acquisition in the at least one neighbor cell to determine a total frequency offset; and
means for applying the total frequency offset before refining frame and symbol timing, residual frequency error, and means for determining a physical cell ID (PCID) of the at least one neighbor cell.

14. The apparatus of claim 8, wherein:
the one or more transmission deployment mode parameters further comprise a raster offset of physical resource blocks (PRBs); and
the means for determining comprises means for inferring the information about the raster offset that include:
means for evaluating a plurality of different hypotheses for different frequency errors to find frame and symbol timing; and
means for using one of the plurality of different hypotheses, selected based on the evaluation, to detect narrowband primary synchronization signals (NPSS) and narrowband secondary synchronization signals.

15. An apparatus for wireless communication by a user equipment (UE), comprising:
at least one processor; and
memory coupled to the at least one processor, the memory comprising instructions executable by the at least one processor to cause the UE to:
determine, while communicating in a serving cell, information regarding one or more transmission deployment mode parameters comprising a number of transmit antennas of at least one neighbor cell, without assistance associated with the one or more transmission deployment mode parameters from the serving cell, wherein the instructions executable by the at least one processor to cause the UE to determine comprises instructions executable by the at least one processor to cause the UE to:
infer the number of transmit antennas used by the at least one neighbor cell by evaluating different hypotheses corresponding to different numbers of transmit antennas, and
select one of the different hypotheses with a higher narrowband reference signal receive power (NRSRP) than another based on the inferring the number of transmit antennas used by the at least one neighbor cell; and
perform a neighbor cell search with measurement of NRSRP based on the determined information regarding the one or more transmission deployment mode parameters.

16. A non-transitory computer readable medium for wireless communication by a user equipment (UE) having instructions stored thereon, the instructions executable by at least one processor to cause the UE to:
determine, while communicating in a serving cell, information regarding one or more transmission deployment mode parameters comprising a number of transmit antennas of at least one neighbor cell, without assistance associated with the one or more transmission deployment mode parameters from the serving cell, wherein the instructions executable by the at least one processor to cause the UE to determine comprises instructions executable by the at least one processor to cause the UE to:
infer the number of transmit antennas used by the at least one neighbor cell by evaluating different hypotheses corresponding to different numbers of transmit antennas, and
select one of the different hypotheses with a higher narrowband reference signal receive power (NRSRP) than another based on the inferring the number of transmit antennas used by the at least one neighbor cell; and
perform a neighbor cell search with measurement of NRSRP based on the determined information regarding the one or more transmission deployment mode parameters.

* * * * *